US006569908B2

(12) United States Patent
Noguchi et al.

(10) Patent No.: US 6,569,908 B2
(45) Date of Patent: May 27, 2003

(54) DISPERSION OF SILICA PARTICLE AGGLOMERATES AND PROCESS FOR PRODUCING THE SAME

(75) Inventors: Tetsuro Noguchi, Chiba (JP); Kozo Tajiri, Tokyo (JP)

(73) Assignee: OJI Paper Co., Ltd. (JP)

( * ) Notice: Subject to any disclaimer, the term of this patent is extended or adjusted under 35 U.S.C. 154(b) by 0 days.

(21) Appl. No.: 09/764,910

(22) Filed: Jan. 16, 2001

(65) Prior Publication Data

US 2001/0011105 A1 Aug. 2, 2001

(30) Foreign Application Priority Data

Jan. 19, 2000 (JP) ........................................ 2000-009640
Apr. 14, 2000 (JP) ........................................ 2000-112869

(51) Int. Cl.$^7$ ............................ B01F 3/12; C01B 31/141
(52) U.S. Cl. ............................ 516/83; 516/81; 516/82; 106/287.34
(58) Field of Search .............................. 516/81, 82, 83, 516/84; 106/287.34

(56) References Cited

U.S. PATENT DOCUMENTS

| 2,577,484 A | | 12/1951 | Rule ............................ 516/81 |
| 2,731,326 A | * | 1/1956 | Alexander et al. ............ 516/82 |
| 6,380,265 B1 | * | 4/2002 | Pryor et al. .................... 516/81 |

FOREIGN PATENT DOCUMENTS

EP    0 803 374 A2   *   10/1997
EP    08033374    10/1997

OTHER PUBLICATIONS

Patent Abstracts of Japan, vol. 004, No. 174 (C–033), Dec. 2, 1980 & JP 55 116613 A (Tokuyama Soda Co Ltd), Sep. 8, 1980, Abstract.
Patent Abstracts of Japan, vol. 011, No. 184 (C–427) Jun. 12, 1987 & JP 62 007622 A (Nissan Chem Ind Ltd), Jan. 14, 1987, Abstract.
Database WPI, Section Ch, Week 199321, Derwent Publications Ltd., London, GB; Class E36, AN 1993–172446, XP002166372 & JP 05 105418 A (Sintokogio Ltd), Apr. 27, 1993, Abstract.

* cited by examiner

*Primary Examiner*—Daniel S. Metzmaier
(74) *Attorney, Agent, or Firm*—Christie, Parker & Hale, LLP

(57) ABSTRACT

The present invention also provides a process for producing a colloidal dispersion of silica particle agglomerates having a specific surface area, as determined by nitrogen adsorption method, of 100 m$^2$/g to 400 m$^2$/g, an average secondary particle diameter of 20 nm to 300 nm and a pore volume of 0.5 ml/g to 2.0 ml/g, which comprises using a colloidal dispersion of silica particle agglomerates having a specific surface area, as determined by nitrogen adsorption method, of 300 m$^2$/g to 1,000 m$^2$/g and a pore volume of 0.4 ml/g to 2.0 ml/g as a seed dispersion, adding a feed solution comprising at least one of an aqueous active silicic acid solution and alkoxysilanes to the seed dispersion in small portions in the presence of an alkali to grow silica particle agglomerates.

7 Claims, 1 Drawing Sheet

DISPERSION OF SILICA PARTICLE AGGLOMERATES AND PROCESS FOR PRODUCING THE SAME

BACKGROUND OF THE INVENTION

The present invention relates to a dispersion in which silica particle agglomerates are dispersed in the form of a colloid, and a process for producing the dispersion. In particular, the present invention relates to a process for producing the dispersion of silica particle agglomerates wherein secondary particles formed by the agglomeration of primary silica particles are dispersed in colloidal form and which dispersion can form a porous coating layer having a high transparency when it is dried.

As for processes for producing dispersions of fine silica particles, many processes for producing colloidal silica wherein the particles are stably monodispersed have been known in the art. For example, U.S. Pat. No. 2,577,484 discloses a process for growing monodispersed colloidal silica particles by treating a diluted aqueous solution of sodium silicate with a cation-exchange resin to form an acidic aqueous active silicic acid solution, adding an alkali to a part of the aqueous solution of active silicic acid to stabilize it, polymerizing it to form a seed dispersion in which the seed particles of silica are monodispersed, polymerizing silicic acid by slowly adding the balance (feed solution) of the aqueous active silicic acid solution while the alkaline condition is kept to polymerize silicic acid and also to grow the monodispersed particles of colloidal silica.

A process most commonly employed for the production of monodispersed colloidal silica on an industrial scale is the above-described ion-exchange resin process. By this process, it has become possible to produce monodispersed colloidal silica having a sharp particle size distribution from an alkali metal silicate such as water glass which is an inexpensive industrial product while the particle diameter is controlled as desired. The monodispersed colloidal silica obtained by such a process is mostly in the form of spherical particles. Because the primary particles are monodispersed without being agglomerated, the particles in dry state are densely packed to form a structure wherein the spaces between the particles are very small. Therefore, the pore volume of the monodispersed colloidal silica is usually smaller than 0.5 ml/g.

On the other hand, a porous silica having a large pore volume include hydrous amorphous silica produced by a wet process. The hydrous amorphous silica is produced by mixing an alkali silicate solution with a mineral acid to form a gel or a precipitate and then wet-pulverizing the product. For example, Japanese Patent unexamined Published Application (hereinafter referred to as "J. P. KOKAI") No. Sho 55-116613 discloses a process for producing hydrous silicic acid/amorphous silica having a pore volume of at least 0.5 ml/g by adding an acid to an aqueous alkali silicate solution dividedly in two portions, filtering the reaction solution to obtain a wet cake of hydrated silicic acid, applying a shearing force or vibration to the wet cake to form a slurry and spray-drying the slurry. In the silica thus obtained by the wet method, the primary particles are agglomerated to form secondary particles. Thus, the silica keeps a pore volume of as high as at least 0.5 ml/g according to the porosities between the primary particles or secondary particles. However, because the particle diameter is 1 to 20 μm, the scattering degree of light is high and the dispersion is usually milky. Even when a mix coating layer with a binder is prepared, the layer is opaque. Further, because the particles are divided by the pulverization method, the thus-obtained product has a wide particle size distribution and when an aqueous dispersion thereof is left to stand, precipitates are formed and the colloidal properties cannot be obtained.

The wet pulverization of the hydrous amorphous silica by a mechanical means is known as a method for obtaining a colloidal dispersion of fine silica particles. For example, J. P. KOKAI No. Hei 9-286165 discloses a process for producing fine particles of colloidal silica which are secondary particles of 10 to 300 nm which are agglomerates of primary particles of 3 to 40 nm by applying a strong force to synthetic amorphous silica by a mechanical means.

For obtaining an aqueous dispersion of secondary particles of silica, a process wherein silica obtained by a dry method is mechanically pulverized in water is also known. For example, Japanese Patent Publication for Opposition Purpose (hereinafter referred to as "J. P. KOKOKU") No. Sho 59-169922 discloses a process for providing silica obtained by dry method excellent in dispersibility and transparency by decomposing a volatile silicon compound in flames at a high temperature. Silica obtained by the dry method is in the form of a bulky powder. An aqueous dispersion of this silica is more easily mechanically pulverized than silica obtained by the wet method. However, because the bond between the agglomerated primary particles is relatively weak, problems are caused. Namely, the agglomerated state is easily broken by a strong capillary force applied to the spaces in the course of the drying of water in the formation of the coating layer and, therefore, cracks are easily formed in the coating layer. Furthermore, volatile silicon compounds, mainly silicon tetrachloride, usually used in the dry method have a problem that the cost of the starting materials for them is higher than that of alkali metal silicates such as water glass used also as the starting materials in the wet method.

SUMMARY OF THE INVENTION

The object of the present invention is to provide a colloidal dispersion of silica particle agglomerates and a process for producing such a colloidal dispersion. The dispersion of silica particles is composed of fine secondary particles, formed by the agglomeration of primary silica particles, in water to form a colloidal dispersion having a sharp particle size distribution. By drying the dispersion, a porous, highly transparent coating film can be formed.

After intensive investigations, the inventors have found that the above-described dispersion of silica particle agglomerates can be produced by a method which will be described below. Namely, according to the present invention, the above-described dispersion of silica particle agglomerates is obtained by using a colloidal dispersion of silica particle agglomerates having specified physical properties as the seed dispersion and growing the silica particle agglomerates contained in the seed dispersion.

In accordance with the present invention, there is provided a process for producing a colloidal dispersion of silica particle agglomerates having a specific surface area, as determined by nitrogen adsorption method, of 100 $m^2/g$ to 400 $m^2/g$, preferably 150 $m^2/g$ to 400 $m^2/g$, an average secondary particle diameter of 20 nm to 300 nm and a pore volume of 0.5 ml/g to 2.0 ml/g, which comprises using a colloidal dispersion of silica particle agglomerates having a specific surface area, as determined by nitrogen adsorption method, of 300 $m^2/g$ to 1,000 $m^2/g$, and a pore volume of 0.4 ml/g to 2.0 ml/g, preferably 0.5 ml/g to 2.0 ml/g, as a seed dispersion, adding an alkali to the seed dispersion and then adding a feed solution comprising at least one of an aqueous active silicic acid solution and alkoxysilanes to the seed dispersion in small portions, i.e., gradually, to grow silica particle agglomerates. That is, the primary silica particles which constitute the agglomerates become bigger particles at this stage.

There is also provided a process for producing a colloidal dispersion of silica particle agglomerates having a specific surface area, as determined by nitrogen adsorption method, of 100 m$^2$/g to 400 m$^2$/g, preferably 150 m$^2$/g to 400 m$^2$/g, an average secondary particle diameter of 20 nm to 300 nm and a pore volume of 0.5 ml/g to 2.0 ml/g, which comprises using a colloidal dispersion of silica particle agglomerates having a specific surface area, as determined by nitrogen adsorption method, of 300 m$^2$/g to 1,000 m$^2$/g, and a pore volume of 0.4 ml/g to 2.0 ml/g, preferably 0.5 ml/g to 2.0 ml/g, as a seed dispersion, and adding a mixture of a feed solution comprising at least one of an aqueous active silicic acid solution and alkoxysilanes and an alkali to the seed dispersion in small portions or adding the feed solution and the alkali in small portions at the same time to grow silica particle agglomerates. That is, the primary silica particles which constitute the agglomerates become bigger particles at this stage.

There is also provided a colloidal dispersion of silica particle agglomerates having a specific surface area, as determined by nitrogen adsorption method, of 100 m$^2$/g to 400 m$^2$/g, preferably 150 m$^2$/g to 400 m$^2$/g, and a pore volume of 0.5 ml/g to 2.0 ml/g, in which the main peak in the particle size distribution, calculated in terms of weight, is in the range of 10 nm to 70 nm as determined by dynamic light scattering method with a laser granulometer, the standard deviation thereof is not larger than 10 nm, and the cumulative weight of the main peak is at least 80% based on the cumulative total weight of all the peaks.

There is also provided a colloidal dispersion of silica particle agglomerates having a specific surface area, as determined by nitrogen adsorption method, of 100 m$^2$/g to 400 m$^2$/g, preferably 150 m$^2$/g to 400 m$^2$/g, and a pore volume of 0.5 ml/g to 2.0 ml/g, which dispersion has an absorbance of not higher than 0.3 when the solid concentration is 1.0 wt. % and an absorbance of not higher than 0.3 when the solid concentration is 10.0 wt. % at a wave length of 560 nm.

There is also provided a process for producing a colloidal dispersion of porous silica particle agglomerates, which comprises dropping an aqueous solution of active silicic acid in hot water to form a dispersion of agglomerates of silica particles, adding an alkali to the dispersion before the formation of precipitates in the dispersion or before the gelation of the dispersion to stabilize the agglomerates of the silica particles and adding an aqueous active silicic acid solution in small portions while the stable state is kept to grow the silica particle agglomerates. That is, the primary silica particles which constitute the agglomerates become bigger particles at this stage.

There is also provided a process for producing a colloidal dispersion of porous silica particle agglomerates, which comprises heating an aqueous solution of active silicic acid to form a dispersion of agglomerates of silica particles, adding an alkali to the dispersion before the formation of precipitates in the dispersion or before the gelation of the dispersion to stabilize the agglomerates of the silica particles and adding an aqueous active silicic acid solution in small portions while the stable state is kept to grow the silica particle agglomerates. That is, the primary silica particles which constitute the agglomerates become bigger particles at this stage.

DESCRIPTION OF THE PREFERRED EMBODIMENTS

Figure 1:
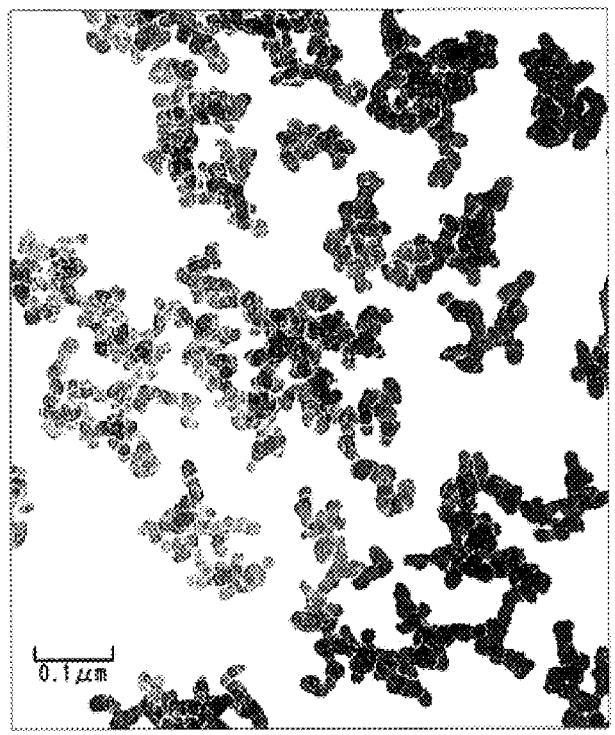
FIG. 1 is a transmission electron photomicrograph of silica particle agglomerates in a dispersion of them obtained in Example 1.

The process of the present invention comprises the steps of preparing a seed dispersion and growing the agglomerates of primary silica particles in the seed dispersion. The silica particle agglomerates in the seed dispersion are those formed by agglomerating primary particles of silica and they are called "seed particles". Because porosities are formed between the primary silica particles to form porous agglomerates, the pore volume is as large as, for example, 0.4 ml/g to 2.0 ml/g.

Although the primary fine particles of silica grow in the growing step, the agglomerates, i. e. secondary particles, have a diameter of, for example, about 20 nm to 300 nm. Namely, the agglomerates are colloidal fine particles, i. e. porous agglomerates of fine silica particles, even after the growing. The agglomerates also have internal porosities between the primary particles. Therefore, the agglomerates have a large pore volume and, as a result, when they are used as a pigment for an ink jet recording medium, a high ink absorption can be obtained advantageously.

A laser granulometer based on the principle of dynamic light scattering method was used for the determination of the average diameter of secondary particles in the present invention. The fine particles dispersed in the dispersion or dilution engage in Brownian movement. The speed of the movement is slow when the particles are large and, on the other hand, it is rapid when they are small. When the solution is irradiated with laser (He—Ne laser), beam, the light is scattered by Rayleigh scattering to cause Doppler shift. The shift of the frequency is determined by photon detection method and then analyzed to determine the particle diameter and the particle size distribution. In the present invention, the synthesized fine particles are highly diluted in water before the determination of the particle diameter. Because the primary particle diameter is at least about 5 nm, the average diameter of the secondary particles is not smaller than the above-described range in the present invention.

The specific surface area and pore volume were determined by the nitrogen adsorption method.

The fact that the specific surface area is small means that the primary particle diameter is large, and also the fact that the specific surface area is large means that the primary particle diameter is small. When the spherical silica particles are in the form of monodispersed silica colloid particle, the diameter of the particles can be calculated by the formula: $D_{(nm)} = 2.720 \times 10^3$/specific surface area (m$^2$/g). However, it is difficult to accurately determine the diameter of the primary particles because the fine silica particles are chemically bonded together to form secondary particles in the present invention. Therefore, the specific surface area is employed as the measure of the average diameter of the primary particles.

The silica particle agglomerates produced by the process of the present invention were observed with a transmission electron microscope (trade mark: H-300 type Hitachi electron microscope; a product of Hitachi, Ltd.) to find that they had a structure formed by the agglomeration of spherical primary particles having a diameter of 5 nm to 30 nm. When the specific surface area is smaller than the above-mentioned range, the primary particles are large and, therefore, the scattering of light is strong to reduce the transparency of the dispersion and the dried coating layer. On the contrary, when the specific surface area is larger than the above-mentioned range, the primary particles are too small and the gelation easily occurs to reduce the workability. Further, in this case, the cracking is easily caused when a dry coating layer is produced by mixing the particles with a binder to make it difficult to obtain the excellent coating layer. By controlling the specific surface area at 100 $m^2/g$ to 400 $m^2/g$, preferably 150 $m^2/g$ to 400 $m^2/g$, the dispersion of silica particle agglomerates having a high transparency and excellent workability can be obtained.

In the present invention, a colloidal dispersion of porous silica particle agglomerates having a specific surface area, as determined by nitrogen adsorption method, of 300 $m^2/g$ to 1,000 $m^2/g$ and a pore volume of 0.4 ml/g to 2.0 ml/g, preferably 0.5 ml/g to 2.0 ml/g, is used as the seed dispersion. Although the average secondary particle diameter of the seed particle agglomerates is not particularly limited, it is preferably 5 nm to 2,000 nm and more preferably 10 to 600 nm. The average secondary particle diameter of the seed particle agglomerates is not necessarily limited to be not larger than 300 nm, because even when it is larger than 300 nm, the secondary particle diameter is sometimes reduced by an alkali added in the growing step or by the mechanical stirring power.

The concentration of the seed particle agglomerates is desirably 0.05 to 10.0% by weight calculated in terms of the silica concentration. When the concentration of the seed particle agglomerates calculated in terms of silica concentration is less than 0.05% by weight, new seed particles might be formed in the subsequent step of growing the seed particle agglomerates to make the particle diameter distribution broad unfavorably. On the other hand, when the concentration of the seed particle agglomerates calculated in terms of silica concentration is more than 10% by weight, the particles might be excessively agglomerated and sometimes the gelation occurs.

An alkali is added in an amount necessitated for preventing a further agglomeration of the seed particles in the seed dispersion. The alkali acts also as a condensation catalyst for active silicic acid added to the seed suspension or as a hydrolysis catalyst for an alkoxysilane. The alkalis are not particularly limited and they include, for example, alkali metal hydroxides such as sodium hydroxide, potassium hydroxide and lithium hydroxide, alkaline earth metal hydroxides, alkali metal silicates, and nitrogen compounds such as ammonia, quaternary ammonium hydroxide and amines. These alkalis are used either alone or in the form of a mixture of two or more of them. Among them, ammonia is preferred because the pH of a solution thereof can be easily controlled and it can be easily volatilized in the step of forming the dry coating layer. In addition, when ammonia is used, the transparency of the dry coating layer comprising silica and a binder is excellent.

Although the amount of the alkali is not particularly limited, the amount should be in such that pH of the solution is 6.5 or higher, preferably 8 or higher. In particular, the amount of the alkali is desirably $1 \times 10^{-3}$ to 1.0 mol, more desirably 0.01 to 0.1 mol, per mol of the silica component ($SiO_2$) in the seed dispersion.

As the amount of the alkali is increased or, in other words, as pH of the solution is increased, the agglomerated seed particles are dispersed and the average secondary particle size is inclined to be reduced under given conditions probably because the electrostatic charge on the surface of the silica seed particles is increased to increase the interparticle repulsion.

The alkali can be added by a method wherein the alkali is added at once to the seed dispersion prior to the growing step, a method wherein the alkali is added in small portions together with the aqueous silicic acid solution or the alkoxysilane to be added to the seed dispersion in the growing step, or a method wherein the alkali is mixed in the aqueous active silicic acid solution or the alkoxysilane and the thus-obtained mixture is added in small portions. When the alkali is mixed in the aqueous active silicic acid solution and the thus-obtained mixture is added to the seed dispersion, the amount of the alkali is desirably controlled so that pH of the aqueous active silicic acid solution will be at least 7. When pH of the aqueous active silicic acid solution is below 7, this solution might be gelled in a short period of time.

In the growing step, the seed dispersion is desirably heated to 60° C. or above, more desirably 80° to 100° C.

A feed solution comprising at least one of the aqueous active silicic acid solution and alkoxysilanes is added in small portions to the heated seed dispersion so as to grow the primary silica particles in the seed dispersion. As the seed particles in the form of the agglomerates grow in the growing step, the primary particles are chemically bonded to each other and, as the result, the very firmly agglomerated primary particles, which cannot be obtained by the dry method, can be formed.

Although the method of adding the feed solution is not particularly limited, it is desirable to continuously add the feed solution at a constant speed.

The aqueous active silicic acid solution used in the present invention is an acidic aqueous silicic acid solution, for example, one that has a pH of not higher than 4, and that is preferably one obtained by, for example, ion-exchanging an aqueous solution of an alkali metal silicate with a hydrogen-type cation exchange resin. The aqueous active silicic acid solution has an $SiO_2$ concentration of preferably 1 to 6% by weight, more preferably 2 to 5% by weight, and a pH of 2 to 4. The alkali metal silicates are those available on the market as industrial products. Sodium water glass having an $SiO_2/M_2O$, wherein M represents an alkali metal atom, molar ratio of about 2 to 4 is preferably used.

$SiO_2$ concentration of the aqueous active silicic acid solution is desirably 1 to 6% by weight. When $SiO_2$ concentration exceeds 6% by weight, the viscosity of the solution in the ion-exchange resin column is increased to make the treatment difficult. On the contrary, when $SiO_2$ concentration is below 1% by weight, water content of the reaction liquid is increased to lower the production efficiency.

In the course of the addition of the feed solution, an alkali may be added in an amount necessary for preventing the agglomeration and precipitation of the silica particle agglomerates due to the lowering of pH of the solution at any time.

The alkoxysilanes usable herein are, for example, tetramethoxysilane, tetraethoxysilane, tetrapropoxysilane, tetra-n-butoxysilane, tetra-sec-butoxysilane and tetra-tert-butoxysilane. Oligomers formed by condensing these alkoxysilanes are also usable. The alkoxysilanes may be used either alone or in the form of a mixture of two or more of them. In the alkoxysilanes, inexpensive tetraethoxysilane is preferred. The alkoxysilanes may be used as they are or after dilution with a solvent. They may be partially hydrolyzed with water before use.

As for the rate of the addition of the feed solution which is at least one of the aqueous active silicic acid solution and alkoxysilanes to the heated seed dispersion, the former is preferably dropped in the latter in an amount of 0.001 to 0.1 mol/min, more preferably 0.001 to 0.05 mol/min, in terms of $SiO_2$, per mol of $SiO_2$ contained in the seed particle agglomerates in the seed dispersion so that superfluous active silicic acid or alkoxysilane which forms new seed particles is not contained in the seed dispersion. When the dropping rate is above this range, monodispersed seed particles are newly formed to make the particle size distribution broad and also to reduce the pore volume.

The amount of the feed solution to be added varies depending on the specific surface area (primary particle diameter) of the seed particle agglomerates in the seed dispersion to be used. The aqueous active silicic acid solution or alkoxysilane is added in an amount corresponding to $SiO_2$ necessary for growing the primary particle diameter for obtaining a desired specific surface area. The aqueous active silicic acid solution and alkoxysilanes to be added are desirably kept at a temperature not higher than 60° C., more desirably not higher than 40° C., so that the condensation does not proceed before the addition to the seed dispersion.

After the completion of the addition of the feed solution, the reaction mixture can be kept stable even when it is directly cooled. However, when the reaction mixture is further heat-treated at a temperature of not lower than 70° C. for 1 to 24 hours to complete the condensation of silicic acid, the particle size distribution of the silica particle agglomerates is narrowed.

Preferably, superfluous water is removed from the thus-obtained dispersion of silica particle agglomerates to increase the concentration of those particles. An evaporator, ultrafiltration membrane or the like is usable for the concentration.

The surfaces of the thus-obtained fine particles may be modified with a silane coupling agent. The silica surface can be modified with various compounds such as polymers, metal oxides, metal hydroxides, cationizing agents, surfactants and amines to impart various functions thereto.

On the other hand, the seed dispersion used for the production of the silica particle agglomerate dispersion by the above-described process, namely, the dispersion of the seed particle agglomerates, can be prepared by methods which will be described below.

In a first process for preparing the seed dispersion, the above-described aqueous solution of active silicic acid is slowly dropped in heated water.

The temperature of the heated water to which active silicic acid is to be added is preferably not lower than 50° C., more preferably not lower than 70° C. When the temperature is low, the condensation velocity of silicic acid is low and, as a result, the efficiency of the preparation of the seed dispersion is low. The pH of water is not higher than 8, preferably not higher than 7. When the pH is above 8, the agglomeration of the seed particles by the condensation of silicic acid cannot be completed. When the seed dispersion obtained under such unsuitable conditions is used, the silica particle agglomerates having a sufficient pore volume cannot be obtained. In such a case, the possibility of the use of the added active silicic acid not for forming new seed particles but for growing the existing seed particles is increased and, as a result, the efficiency of the preparation of the seed dispersion is reduced.

The progress of the agglomeration of the seed particles largely depends on solid $SiO_2$ concentration in the solution and heating time. Namely, the agglomeration of the seed particles proceeds as the amount of the active silicic acid added to the hot water is increased to lower pH of the solution toward the isoelectric point of silica (about pH 2.2), and also as the heating time after the initiation of the addition of the aqueous active silicic acid solution is prolonged. Therefore, the ratio of the aqueous active silicic acid solution to water to be fed and also the addition rate of the aqueous active silicic acid solution to hot water are fixed at optimums on the basis of such inclinations.

The method of adding the aqueous active silicic acid solution to the hot water is not particularly limited. The solution may be added either continuously or intermittently. The continuous addition at a constant rate is the easiest method. When the aqueous active silicic acid solution is continuously added to the hot water at a constant rate, this rate is desirably such that the solid content (calculated in terms of $SiO_2$) of the aqueous active silicic acid solution is 0.01 to 1.5 parts by weight for 500 parts by weight of the hot water per minute. When the rate is lower than this range, the preparation efficiency of the seed dispersion is low and, on the contrary, when the rate is higher than this range, the control of the agglomeration of the seed particles is difficult and in some cases, a gel or a precipitate is formed.

The more the agglomeration of seed particles proceeds, the larger the average diameter of the secondary particles and also the larger the pore volume obtained by growing step by using the seed dispersion under a predetermined condition. However, when the agglomeration of the seed particles excessively proceeds, the solution is gelled and the seed particle agglomerates are precipitated. In such a case, the product cannot be stabilized in the form of the colloid even by the addition of the alkali, and is unsuitable for use as the seed dispersion.

In a second process for producing the seed dispersion, the above-described aqueous active silicic acid solution is heated. The aqueous active silicic acid solution is one that has an $SiO_2$ concentration of preferably 1 to 6% by weight, more preferably 2 to 5% by weight, and a pH of 2 to 4.

The heating temperature for the aqueous active silicic acid solution is desirably not lower than 40° C. When the temperature is below 40° C., the condensation velocity of silicic acid is low and the production efficiency of the seed dispersion is reduced.

The proceeding of the agglomeration of seed particles largely depends on the concentration of the aqueous active silicic acid solution (in terms of $SiO_2$) and heating time. Namely, as the concentration of the aqueous active silicic acid solution is increased and the heating time is prolonged, the agglomeration rate of the seed particles is increased. The more the agglomeration of seed particles proceeds, the larger the average diameter of the secondary particles and also the larger the pore volume obtained by growing step by using the seed dispersion under a predetermined condition. However, when the agglomeration of the seed particles excessively proceeds, the solution is gelled. In such a case, the product cannot be stabilized in the form of the colloid even by the addition of the alkali, and is unsuitable for use as the seed dispersion.

In the above-described first and second processes for preparing the seed dispersion, in some cases, the agglomeration of the seed particles proceeds not in direct proportion to the reaction time but exponentially, and the agglomeration of the seed particles excessively proceeds in a short time to cause the gelation of the solution or the precipitation. This phenomenon can be reduced by using an anti-gelling agent in the preparation of the seed dispersion. As the anti-gelling agents, water-soluble organic solvents are known. In them, alcohols are the most easily used and preferred. As for the alcohols, any alcohol highly soluble in water is usable. Examples of them include methanol, ethanol, isopropyl alcohol, n-propyl alcohol, n-butanol, isobutanol, tert-butanol, ethylene glycol, propylene glycol and glycerol. In these alcohols, methanol, ethanol, isopropyl alcohol and n-propyl alcohol are preferred because (1) they can be easily removed from the dispersion of silica particle agglomerates due to their low boiling point and (2) they are inexpensive.

In the first process for producing the seed dispersion, the alcohol can be previously added to the hot water or it can be previously added to the seed dispersion before the beginning of the growing step. However, preferably, the alcohol is added immediately before the beginning of the growing step because the agglomeration of the seed particles is indispensable for obtaining the dispersion of silica particle agglomerates having a large pore volume. Also in the second process for producing the seed dispersion, the alcohol can be previously added to active silicic acid or it can be previously added to the seed dispersion before the beginning of the growing step. However, preferably, the alcohol is added immediately before the beginning of the growing step for obtaining the dispersion of silica particle agglomerates having a large pore volume.

The relative amount of the alcohol is desirably 10 to 300 parts by weight by part by weight of the solid silica in the seed dispersion.

When an alkylammonium salt is added in the step of preparing the seed dispersion in the first and second processes, the agglomeration of the seed particles is accelerated and the preparation time for the seed solution is reduced advantageously. Another effect obtained by the addition of the alkylammonium salt is that the stability of the dispersion of the silica particle agglomerates is improved. When the alkylammonium salt is not added, the viscosity is rapidly increased as the concentration of the finally obtained dispersion of silica particle agglomerates is increased and, in some cases, the gelation occurs in a short time. However, when the dispersion of silica particle agglomerates is prepared by using the alkylammonium salt, this phenomenon can be effectively reduced.

The alkylammonium salts usable herein are not particularly limited. They include monoalkylammonium salts such as methylammonium salts, ethylammonium salts, propylammonium salts, butylammonium salts, laurylammonium salts and stearylammonium salts; dialkylammonium salts such as dimethylammonium salts and diethylammonium salts; trialkylammonium salts such as trimethylammonium salts and triethylammonium salts; and tetraalkylammonium salts such as tetramethylammonium salts, tetraethylammonium salts, lauryltrimethylammonium salts, stearyltrimethylammonium salts, distearyldimethylammonium salts and alkylbenzyldimethylammonium salts. In these alkylammonium salts, the tetraalkylammonium salts are preferred because they are highly effective. Tetramethylammonium salts are particularly preferred. When a tetramethylammonium salt is used in even a very small amount, its excellent effect of accelerating the agglomeration of the seed particles and also improving the stability of the finally obtained dispersion of silica particle agglomerates is obtained.

The amount of the alkylammonium salt is preferably 0.05 to 1% by weight, in terms of $SiO_2$ contained in the aqueous active silicic acid solution used in the preparation of the seed dispersion.

As for the method of the addition of the alkylammonium salt, it is desirably previously added to the hot water in the first process for preparing the seed dispersion, and it is desirably previously added to the aqueous active silicic acid solution in the second process for preparing the seed dispersion.

In a third process for preparing the seed dispersion, an alkoxysilane is added to water to hydrolyze this compound. The alkoxysilanes usable herein are tetramethoxysilane, tetraethoxysilane, tetrapropoxysilane, tetra-n-butoxysilane, tetra-sec-butoxysilane, tetra-tert-butoxysilane, etc. Oligomers obtained by the condensation of these alkoxysilanes are also usable. The alkoxysilanes are used either alone or in the form of a mixture of them. In these alkoxysilanes, inexpensive tetraethoxysilane is preferred.

The alkoxysilane can be hydrolyzed by either adding the alkoxysilane in small portions to heated water or by heating a mixture of water and the alkoxysilane. In the former method, the temperature of heated water to which the alkoxysilane is to be added is preferably 40° C. to 100° C., more preferably 70° C. to 100° C. When the temperature is below 40° C., the hydrolysis speed is low and the efficiency of producing the seed dispersion is lowered. On the contrary, when the temperature is above 100° C., bumping of ethanol formed by the hydrolysis might occur.

The pH of water is preferably not higher than 8, more preferably not higher than 7. When the pH is above 8, the seed particles formed by the hydrolysis of the alkoxysilane do not sufficiently agglomerate, and the silica particle agglomerates having a pore volume sufficient for use as the seed dispersion may not be obtained.

In the latter method, the amount of water to be mixed with the alkoxysilane is preferably 50 to 800 mols, more preferably 100 to 400 mols, per mol of silicon contained in the alkoxysilane.

When less than 50 mols of water is used per mol of silicon contained in the alkoxysilane for the hydrolysis, the agglomeration of the particles is excessively accelerated to form coarse secondary particles unfavorably. On the contrary, when more than 800 mol of water is used per mol of silicon, the secondary particles may not be formed probably because the collision frequency of the primary particles with each other in the aqueous solution is relatively low.

It is desirable that any acidic catalyst or basic catalyst is not used when the alkoxysilane is mixed with water. When such a catalyst is added, the secondary particles having a suitable degree of agglomeration after the hydrolysis cannot be obtained. The hydrolysis time is preferably in the range of 3 to 40 hours, more preferably in the range of 6 to 24 hours. When the hydrolysis time is shorter than 3 hours, the condensation of the hydrolyzed active silicic acid may not sufficiently proceed and the desired effect may not be obtained. When the hydrolysis time is longer than 40 hours, the agglomeration of the particles excessively proceeds and the dispersion is gelled in some cases.

In a fourth process for preparing the seed dispersion, silica obtained by wet method, silica obtained by dry method or a mixture of them is mechanically pulverized. In this method, silica obtained by wet method or silica obtained by dry method, which has a specific surface area determined by the nitrogen adsorption method of 300 $m^2$/g to 1,000 $m^2$/g and a pore volume of 0.4 ml/g to 2.0 ml/g, preferably 0.5 ml/g to 2.0 ml/g, or a mixture of them is pulverized by a mechanical means to obtain the seed dispersion. Silica obtained by the dry method is preferred because it can be easily pulverized.

The mechanical means are, for example, ultrasonic homogenizer, pressure homogenizer, nanomizer, high-speed tumbling mill, roller mill, container-driving medium mill, ball mill, medium stirring mill, jet mill and sand grinder. A combination of these means may be also employed. Preferably, silica dispersed in water is pulverized by the wet method. In this case, the thus-obtained dispersion can be directly used as the seed dispersion in the present invention. When the dry pulverizing method is employed, the pulverized silica is dispersed in water and, if necessary, the wet pulverization is further performed to obtain the seed dispersion.

By the above-described processes for preparing the seed dispersion and the process for preparing dispersion of silica particle agglomerates by the growing of the seed dispersion, it is made possible to obtain a colloidal dispersion of silica particle agglomerates having a sharp particle size distribution, namely, the colloidal dispersion of silica particle agglomerates having a specific surface area, as determined by nitrogen adsorption method, of 100 $m^2/g$ to 400 $m^2/g$, and a pore volume of 0.5 ml/g to 2.0 ml/g, in which the main peak in the particle size distribution, calculated in terms of weight, is in the range of 10 nm to 70 nm as determined by dynamic light scattering method with a laser granulometer, the standard deviation thereof is not larger than 10 nm, and the cumulative weight of the main peak is at least 80% based on the cumulative total weight of all the peaks.

According to the present invention, it is made possible to produce a highly transparent colloidal dispersion of silica particle agglomerates having a specific surface area, as determined by nitrogen adsorption method, of 100 $m^2/g$ to 400 $m^2/g$, a pore volume of 0.5 ml/g to 2.0 ml/g, which dispersion has an absorbance of not higher than 0.3 when the solid concentration is 1.0 wt. % and an absorbance of not higher than 0.3 when the solid concentration is 10.0 wt. % at a wave length of 560 nm.

The dispersion of silica particle agglomerates produced by the present invention has a high pore volume while the particle size is extremely small. In addition, the dispersion has a sharp particle size distribution and a high transparency. Such silica particle agglomerates are suitable for use for preparing an ink-receiving layer of an ink jet recording sheet. Namely, when the dispersion is used for forming the ink-receiving layer, a large amount of inks can be rapidly absorbed in the layer, the surface of this layer is very glossy, and vivid, full-colored images having a high color density can be obtained. In addition, because the primary particles are firmly bound with each other, the resistance to the break of the agglomeration by a powerful capillary force in the course of drying the coating film is high, and the dry coating film effectively protected from cracking can be obtained.

The term "pore volume" herein indicates the volume of the whole pores having a diameter of not larger than 100 nm.

Adhesives used in the ink-receiving layer of the ink jet recording sheets of the present invention, which is prepared by using the silica dispersion, include starch derivatives such as oxidized starch and etherified starch; cellulose derivatives such as carboxymethylcellulose and hydroxyethylcellulose; casein; gelatin; soybean protein; aqueous adhesives such as completely saponified polyvinyl alcohol, partially saponified polyvinyl alcohol, silicon-modified polyvinyl alcohol, acetoacetyl group-modified polyvinyl alcohol, styrene/maleic anhydride copolymer salts, styrene/butadiene latex, acrylic latex, polyester/polyurethane latices and vinyl acetate latex; and organic solvent-soluble resins such as polymethyl methacrylate, polyurethane resin, unsaturated polyester resins, vinyl chloride/vinyl acetate copolymer, polyvinyl buryral and alkyd resins. They are used either alone or in the form of a mixture of two or more of them.

These adhesives are used in an amount of usually about 1 to 200 parts by weight, preferably about 10 to 100 parts by weight, for 100 parts by weight of the pigment.

The ink-receiving layer may suitably contain a cationic resin, a pigment dispersant, a thickening agent, a crosslinking agent, a fluidity modifier, an antifoaming agent, a foam-inhibitor, a releaser, a foaming agent, a penetrant, a dye, a coloring pigment, a fluorescent brightener, an antiseptic, a mildew-proofing agent and water-resisting agent.

The ink-receiving layer is formed by applying the coating composition for forming the ink-receiving layer to at least one surface of the base with a bar coater, blade coater, air-knife coater, gravure coater, die coater or curtain coater in such an amount that the coating amount will be about 2 to 30 $g/m^2$ after drying. When the coating amount is less than 2 $g/m^2$, the quality of the recorded image might be lowered and, on the contrary, when it is more than 30 $g/m^2$, the strength of the coating film might be lowered.

When a very high gloss is necessitated, the ink-receiving layer can be gloss-finished.

The gloss-finishing methods include, for example a cast coating method and a film transfer method, wherein an ink-receiving layer is transferred to the support taking advantage of the molded surface having a predetermined smoothness.

The casting methods include wetting method, gelation method and re-wetting method. In the wetting method, a gloss-developing layer formed on the support paper is pressed on a heated surface of a mirror plane of a drum while the layer is wet to attain a strong gloss finish. In the gelation method, the gloss-developing layer formed on the support paper is brought into contact with a bath containing a gelling agent while the layer is wet and then the gloss-developing layer thus gelled is pressed against the surface of a heated drum to attain a strong gloss finish. In the re-wetting method, the wet gloss-developing layer is once dried, then brought into contact with a wetting liquid again and pressed against the surface of a heated drum to attain a strong gloss finish.

In another preferred embodiment, the ink-receiving layer is formed on a smooth surface of a film or the like by coating, then the layer is transferred to a support (or an ink-receiving layer when the support has another ink-receiving layer) and the smooth film is peeled off to obtain a high gloss like that of a silver salt photograph.

Materials usable for forming the smooth surface include plastic films such as cellophane, polyethylene, polypropylene, plasticized polyvinyl chloride, rigid polyvinyl chloride and polyesters; papers such as polyethylene-laminated paper, glassine paper, impregnated paper and vapor-deposited paper; flexible sheets of metal foils, synthetic papers, etc.; and drums and plates having the very smooth surface made of an inorganic glass, a metal or a plastic. From the viewpoints of the production steps and peeling easiness of the recording layer from the smooth surface, high-molecular films (such as polyethylene, polypropylene and polyesters) and metal drums having a very smooth surface are preferred.

For the purpose of imparting the gloss, the molding surface is preferably smooth. The roughness of the molding surface (JIS B-0601) is preferably Ra 0.5 μm or below, more preferably 0.05 μm or below. The roughness of the surface can be controlled to realize a semi-glossy feeling or the like.

The following Examples will further illustrate the present invention. The test methods in the Examples and Comparative Examples were as described below.

(Methods of Determining Specific Surface Area, Pore Volume and Pore Diameter of Silica Particle Agglomerates)

A dispersion of silica particle agglomerates was dried at 105° C. The thus-obtained dry powder sample was pretreated by the vacuum degasification at 200° C. for two hours and then specific surface area, pore volume and pore diameter distribution of the sample were determined by means of a specific surface area/pore distribution determination device (SA 3100 plus type of Coulter Co.) by gas adsorption method. Nitrogen was used as the gas to be adsorbed. The specific surface area was determined by BET method, and the pore volume was the volume of the whole pores having a diameter of not larger than 100 nm. The pore diameter was that of the maximum volume fraction in a pore distribution curve obtained by the analysis of desorption isotherm by BJH method.

(Method of Determining Average Diameter of Secondary Particles i.e., Silica Particle Agglomerates)

The average diameter of secondary particles was determined by dynamic light scattering method with a laser particle size distribution meter (trade name: LPA 3000/3100; a product of Otsuka Denshi K.K.) after diluting a dispersion of silica particle agglomerates with a large amount of distilled water. The average diameter of secondary particles was calculated by the analysis by a cumulant method. The particle size distribution calculated in terms of weight, and the particle size at the peak were calculated from the particle size distribution calculated by a histogram method.

(Method of Determining Absorbance of Dispersion of Silica Particle Agglomerates)

The dispersion of silica particle agglomerates was diluted with distilled water or concentrated with an evaporator to a solid content of 1% or 10% by weight. The absorbance of the dispersion at 560 nm was determined with a spectrophotometer (U-2000 Double beam spectrophotometer; a product of Hitachi, Ltd.)

(Methods of Preparation and Evaluation of Coating Film Containing Silica Particle Agglomerates)

The dispersion of the silica particles was concentrated to a solid content of 10% by weight with an evaporator. 25 parts by weight (in terms of solid) of 6% aqueous solution of completely saponified polyvinyl alcohol (trade name: PVA-140H; a product of Kuraray Co., Ltd.) was mixed with 100 parts by weight (in terms of solid silica) of the concentrated dispersion to form a coating composition. The coating composition was applied in an amount of 5 g/m² and 25 g/m² on dry basis to a transparent polyethylene terephthalate film (trade name: Lumirrow 100-Q80D; a product of Toray Industries, Inc.) having a thickness of 100 μm, used as the support, by bar coating method. The sheet coated with 5 g/m² of the coating composition was dried at 100° C. and the sheet coated with 25 g/m² of the coating composition was dried at 40° C.

The percent transmission, haze and 75° gloss of the sheet coated with 5 g/m² of the coating composition paint were determined. As for the sheet coated with 25 g/m² of the coating composition, the degree of cracking of coating layer thereof and the ink absorption thereof after the printing with an ink jet printer were macroscopically checked.

(Method of Determining Percent Transmission Through Coating Film Containing Silica Particle Agglomerates)

The percent transmission through the coating film containing silica particle agglomerates (amount of coating: 5 g/m²) was determined according to JIS K 7105.

(Method of Determining Haze of Coating Film Containing Silica Particle Agglomerates)

The haze of the coating film containing silica particle agglomerates (amount of coating: 5 g/m²) was determined according to JIS K 7105.

(Method of Determining 75° Gloss of Coating Film Containing Silica Particle Agglomerates)

75° gloss of the coating film containing silica particle agglomerates (amount of coating: 5 g/m²) was determined according to JIS P 8142.

(Degree of Cracking of Coating Film Containing Silica Particle Agglomerates)

The degree of cracking of the coating film containing silica particle agglomerates (amount of coating: 25 g/m²) was macroscopically determined. The results were divided into the following 5 groups:

5: The coating film was not cracked at all.
4: The coating film was partially cracked.
3: The whole surface of the coating film was cracked.
2: The whole surface of the coating film was cracked, and the fragments were peeled off when the surface was touched.
1: The whole surface of the coating layer was cracked, and the fragments were naturally peeled off in the course of the drying.

(Ink Absorption of Coating Film Containing Silica Particle Agglomerates)

Two kinds of images of ISO-400 [name of the images: Fruit basket (p. 13) and Candle (p. 14) of fine colored digital standard image data ISO/JIS-SCID published by Japanese Standards Association] were printed on the coating film containing silica particle agglomerates (amount of coating: 25 g/m²) according to a printing mode recommended for superfine special paper with an ink jet printer (PM-700C, a product of EPSON). The image qualities were macroscopically divided into the following five groups:

5: The ink did not run over, the boundaries between colors were clear, and the solid part was uniform.
4: Although the ink did not run over, the boundaries between colors were a little unclear.
3: The ink ran over particularly in the solid part.
2: The ink ran over the whole surface, and the images were partially broken.
1: The ink was hardly absorbed, and the images were wholly broken.

EXAMPLE 1

(Preparation of Aqueous Active Silicic Acid Solution)

A sodium silicate solution having an $SiO_2$ concentration of 30% by weight and $SiO_2/Na_2O$ molar ratio of 3.1 [No. 3 sodium silicate; a product of Tokuyama Co., Ltd.] was mixed with distilled water to obtain a dilute aqueous sodium silicate solution having an $SiO_2$ concentration of 4.0% by weight. This aqueous solution was passed through a column charged with a hydrogen-type cation exchange resin [Diaion SK-1BH; a product of Mitsubishi Chemical Co. Ltd.] to obtain an aqueous active silicic acid solution.

The aqueous active silicic acid solution thus obtained had an $SiO_2$ concentration of 4.0% by weight and pH of 2.9. The concentration calculated in terms of $Na_2O$ was below 0.1% by weight.

(Preparation of Seed Dispersion)

500 g of distilled water was heated to 100° C. in a 5-liter glass reaction vessel provided with a reflux condenser, a stirrer and a thermometer. 450 g of the aqueous active silicic acid solution was added at a rate of 1.5 g/min to the hot water while it was kept at 100° C. to obtain a seed dispersion. The physical properties of the seed particle agglomerates in the seed dispersion are shown in Table 1.

(Preparation of Dispersion of Silica Particle Agglomerates and Formation of Coating Film Containing Silica Particle Agglomerates)

950 g of the seed dispersion in the above-described glass reaction vessel was stabilized by adding 0.015 mol of ammonia, and then the stabilized dispersion was heated to 100° C. 550 g of the aqueous active silicic acid solution prepared as described above was added to the seed dispersion at a rate of 1.5 g/min. After the completion of the addition of active silicic acid, the thus-obtained solution was heated at 100° C. under reflux for 9 hours to obtain a dispersion of silica particle agglomerates. The dispersion was a bluish, transparent liquid having pH of 7.2. The properties of the dispersion of silica particle agglomerates are shown in Table 2, and those of the coating film containing the silica particle agglomerates are shown in Table 3. The coating film containing the silica particle agglomerates had a high transparency and a high gloss. The ink absorption in the coating film in the ink jet printing was sufficient, and fine printing results were obtained. FIG. 1 is a transmission electron microphotograph of the thus-obtained silica particle agglomerates. It could be confirmed that many primary particles of silica were agglomerated to form secondary particles and a large quantity of porosities were shown in the agglomerates.

EXAMPLE 2

(Preparation of Dispersion of Silica Particle Agglomerates and Formation of Coating Film Containing Silica Particle Agglomerates)

950 g of the same seed dispersion as that used in Example 1 was stabilized by adding 1.2 g of No. 3 sodium silicate ($SiO_2$ concentration of 30% by weight) (a product of Tokuyama Co., Ltd.) in the same reaction vessel as that used in Example 1, and then the stabilized dispersion was heated to 100° C. 550 g of the same aqueous active silicic acid solution as that used in Example 1 was added to the seed dispersion at a rate of 1.5 g/min. After the completion of the addition of active silicic acid, the thus-obtained solution was heated at 100° C. under reflux for 7 hours to obtain a dispersion of silica particle agglomerates. The dispersion was a bluish, transparent liquid having pH of 8.3. The properties of the dispersion of silica particle agglomerates are shown in Table 2, and those of the coating film containing the silica particle agglomerates are shown in Table 3. Although the coating film containing the silica particle agglomerates was a little milky as compared with the coating film prepared in Example 1, the level of the milkiness was practically acceptable. The ink absorption in the coating film was sufficient in the ink jet printing, and fine printing results were obtained.

EXAMPLE 3

(Preparation of Seed Dispersion)

400 g of the same aqueous active silicic acid solution of as that used in Example 1 was heated to 100° C. at a rate of 2° C./min in the same reaction vessel as that used in Example 1. Then the solution was kept at 100° C. for 40 minutes to obtain a seed dispersion. The physical properties of the seed particle agglomerates in the seed dispersion are shown in Table 1.

(Preparation of Dispersion of Silica Particle Agglomerates and Formation of Coating Film Containing Silica Particle Agglomerates)

400 g of the seed dispersion obtained as described above was stabilized by adding 0.1 mol of ammonia in the same reaction vessel as that used in Example 1, and then the stabilized dispersion was heated to 100° C. 600 g of the same aqueous active silicic acid solution as that used in Example 1 was added to the seed dispersion at a rate of 1.5 g/min. After the completion of the addition of active silicic acid, the thus-obtained solution was heated at 100° C. under reflux for 9 hours to obtain a dispersion of silica particle agglomerates. The dispersion was a bluish, transparent liquid having pH of 6.7. The properties of the dispersion of silica particle agglomerates are shown in Table 2, and those of the coating film containing the silica particle agglomerates are shown in Table 3. The coating film containing the silica particle agglomerates had a high transparency and a high gloss. Although somewhat running over of the ink was found in the ink jet printing on this coating film, it was practically acceptable without any problem.

EXAMPLE 4

(Preparation of Seed Dispersion)

960 g of distilled water was strongly stirred in a 2-liter glass reaction vessel provided with a reflux condenser, a stirrer and a thermometer. 60 g of tetraethylorthosilicic acid was added at once to the water. Then the temperature was elevated to 95° C. at a rate of 2° C./min. After strongly stirring at that temperature for 24 hours, a seed dispersion was obtained. The physical properties of the seed particle agglomerates in the seed dispersion are shown in Table 1.

(Preparation of Dispersion of Silica Particle Agglomerates and Formation of Coating Film Containing Silica Particle Agglomerates)

800 g of the seed dispersion obtained as described above and kept in the same reaction vessel as that used in Example 1 was stabilized by adding 0.1 mol of ammonia, and then the stabilized dispersion was heated to 100° C. 150 g of the same aqueous active silicic acid solution as that used in Example 1 was added to the seed dispersion at a rate of 1.5 g/min. After the completion of the addition of active silicic acid, the thus-obtained solution was heated at 100° C. under reflux for 2 hours to obtain a dispersion of silica particle agglomerates. The dispersion was milky and had a pH of 6.1. The properties of the dispersion of silica particle agglomerates are shown in Table 2, and those of the coating film containing the silica particle agglomerates are shown in Table 3. As compared with the coating film containing silica particle agglomerates, which was obtained in Example 1, the thus-obtained coating film containing the silica particle agglomerates was a little more milky and less glossy. However, the milkiness and less gloss were practically acceptable without any problem. The ink absorption in the coating film in the ink jet printing was sufficient, and fine printing results were obtained.

EXAMPLE 5

(Preparation of Seed Dispersion)

910 g of water was added to 90 g of silica obtained by dry method [AEROSIL 300; a product of Nippon Aerosil K.K.], and they were stirred to obtain a dispersion having a concentration of 9%. The dispersion was treated with a super high pressure homogenizer [Microfluidizer M110-E/H; a product of Mizuho Industrial Co. Ltd.] under a pressure of 1500 kg/cm$^2$ twice to obtain a seed dispersion. The physical properties of the seed particle agglomerates in the seed dispersion are shown in Table 1.

(Preparation of Dispersion of Silica Particle Agglomerates and Formation of Coating Film Containing Silica Particle Agglomerates)

167 g of the seed dispersion obtained as described above was diluted with distilled water to make the total weight 500 g and then the diluted dispersion was stabilized by adding 0.1 mol of ammonia. The diluted seed dispersion was heated to 100° C. in the same reaction vessel as that used in Example 1. 180 g in total of the same aqueous active silicic acid solution as that used in Example 1 was added to the seed dispersion at a rate of 1.5 g/min. After the completion of the addition of active silicic acid, the thus-obtained solution was heated at 100° C. under reflux for 90 minutes to obtain a dispersion of silica particle agglomerates. The dispersion was white and had a pH of 8.2. The properties of the dispersion of silica particle agglomerates are shown in Table 2, and those of the coating film containing the silica particle agglomerates are shown in Table 3. As compared with the coating film containing silica particle agglomerates, which was obtained in Example 1, the thus-obtained coating film containing the silica particle agglomerates was a little more milky and less glossy. However, the milkiness and less gloss were practically acceptable without any problem. The ink absorption in the coating film in the ink jet printing was sufficient, and fine printing results were obtained.

EXAMPLE 6

(Preparation of Seed Dispersion)

500 g of distilled water was heated to 100° C. in the same reaction vessel as that used in Example 1. 540 g of the same aqueous active silicic acid solution as that used in Example 1 was added at a rate of 1.5 g/min to obtain a seed dispersion. The physical properties of the seed particle agglomerates in the seed dispersion are shown in Table 1.

(Preparation of Dispersion of Silica Particle Agglomerates and Formation of Coating Film Containing Silica Particle Agglomerates)

1040 g of the seed dispersion obtained as described above was stabilized by adding 0.017 mol of ammonia in the same reaction vessel as that used in Example 1, and then the stabilized dispersion was heated to 100° C. 660 g of the same aqueous active silicic acid solution as that described above was added to the seed dispersion at a rate of 1.5 g/min. 0.017 mol of ammonia was added again after the addition of a part (180 g) of the aqueous active silicic acid solution. After the completion of the addition of the aqueous active silicic acid solution, the thus-obtained solution was heated at 100° C. under reflux for 8 hours to obtain a dispersion of silica particle agglomerates. The dispersion was slightly milky and had a pH of 6.4. The properties of the dispersion of silica particle agglomerates are shown in Table 2, and those of the coating film containing the silica particle agglomerates are shown in Table 3. As compared with the coating film containing silica particle agglomerates, which was obtained in Example 1, the thus-obtained coating film containing the silica particle agglomerates was a little more milky. However, the milkiness was practically acceptable without any problem. The ink absorption in the coating film in the ink jet printing was sufficient, and fine printing results were obtained.

EXAMPLE 7

(Preparation of Seed Dispersion)

500 g of distilled water was heated to 100° C. in the same reaction vessel as that used in Example 1. 500 g of the same aqueous active silicic acid solution as that used in Example 1 was added at a rate of 1.6 g/min to obtain a seed dispersion. The physical properties of the seed particle agglomerates in the seed dispersion are shown in Table 1.

(Preparation of Dispersion of Silica Particle Agglomerates and Formation of Coating Film Containing Silica Particle Agglomerates)

570 g of the seed dispersion obtained as described above and kept in the same reaction vessel as that used in Example 1 was stabilized by adding 0.057 mol of ammonia, and then the stabilized dispersion was heated to 100° C. 20 g of a tetraalkoxysilane (tetraethoxysilane) was added to the seed dispersion at a rate of 0.1 g/min. After the completion of the addition of the tetraalkoxysilane, the thus-obtained solution was heated at 100° C. under reflux for 12 hours to obtain a dispersion of silica particle agglomerates. The dispersion was a bluish, transparent liquid having pH of 7.5. The properties of the dispersion of silica particle agglomerates are shown in Table 2, and those of the coating film containing the silica particle agglomerates are shown in Table 3. The coating film containing the silica particle agglomerates had a high transparency. Although the surface of the coating layer had only few cracks, this problem could be solved by increasing the amount of completely saponified polyvinyl alcohol to be added or by reducing the amount of the coating. The ink absorption in the coating film in the ink jet printing was sufficient, and fine printing results were obtained.

EXAMPLE 8

(Preparation of Seed Dispersion)

500 g of distilled water was heated to 100° C. in the same reaction vessel as that used in Example 1. 360 g of the same aqueous active silicic acid solution as that used in Example 1 was added to the hot water at a rate of 1.5 g/min to obtain a seed dispersion. The physical properties of the seed particle agglomerates in the seed dispersion are shown in Table 1.

(Preparation of Dispersion of Silica Particle Agglomerates and Formation of Coating Film Containing Silica Particle Agglomerates)

860 g of the seed dispersion obtained as described above was heated to 100° C. in the same reaction vessel as that used in Example 1. 640 g of the same aqueous active silicic acid solution as that used in Example 1, which contained 0.015 mol of ammonia, was added to the seed dispersion at a rate of 1.5 g/min. After the completion of the addition of the aqueous active silicic acid solution, the thus-obtained solution was heated at 100° C. under reflux for 12 hours to obtain a dispersion of silica particle agglomerates. The dispersion was a bluish, transparent liquid having pH of 8.9. The properties of the dispersion of silica particle agglomerates are shown in Table 2, and those of the coating film containing the silica particle agglomerates are shown in Table 3. The coating film containing the silica particle agglomerates had a high transparency and a high gloss. Although somewhat running over of the ink was found in the ink jet printing on the coating film, the ink could be highly absorbed and fine printing results were obtained by increasing the amount of the coating.

EXAMPLE 9

(Preparation of Seed Dispersion)

500 g of distilled water was heated to 100° C. in the same reaction vessel as that used in Example 1. 540 g of the same aqueous active silicic acid solution as that used in Example 1 was added to the hot water at a rate of 2.0 g/min to obtain a seed dispersion. In this step, 25 g of methanol was added as an antigelling agent after 360 g in total of the aqueous active silicic acid solution had been added. The physical properties of the seed particle agglomerates in the seed dispersion are shown in Table 1.

(Preparation of Dispersion of Silica Particle Agglomerates and Formation of Coating Film Containing Silica Particle Agglomerates)

1040 g of the seed dispersion obtained as described above was stabilized by addition of 0.003 mol of ammonia, and then the dispersion was heated to 100° C. in the same reaction vessel as that used in Example 1. 460 g of the same aqueous active silicic acid solution as that described above was added to the seed dispersion at a rate of 2.0 g/min. In this step, 0.006 mol of ammonia was again added after 120 g in total of the aqueous active silicic acid solution had been added. After the completion of the addition of active silicic acid, the thus-obtained solution was kept at 100° C. under reflux for 13 hours to obtain a dispersion of silica particle agglomerates. The dispersion was a bluish, transparent liquid having pH of 6.4. The properties of the dispersion of silica particle agglomerates are shown in Table 1, and those of the coating film containing the silica particle agglomerates are shown in Table 2. The coating film containing the silica particle agglomerates had a high transparency and a high gloss. The ink could be highly absorbed in the coating film in the ink jet printing and fine printing results were obtained.

COMPARATIVE EXAMPLE 1

A dispersion of silica particle agglomerates was prepared in the same manner as that of Example 1 except that ammonia was not added. The dispersion was gelled in the course of the dropping of the aqueous active silicic acid solution. The properties of the gelled product are shown in Table 2. The gelled product had a specific surface area of as large as 874 m²/g. The growing of the primary silica particles was not enough.

COMPARATIVE EXAMPLE 2

A dispersion of silica particle agglomerates was prepared in the same manner as that of Example 1 except that 0.015 mol of ammonia was added to the heated distilled water at the start of the preparation (not after the preparation) of the seed dispersion. The thus-obtained dispersion of silica particle agglomerates was a bluish, transparent liquid having pH of 6.6. The properties of this dispersion are shown in Table 2, and those of the coating film containing the silica particles are shown in Table 3. The silica particles contained in this dispersion had a pore volume of as small as 0.39 ml/g. Although the coating film containing the silica particles had a high transparency and a high gloss, the ink was scarcely absorbed in the coating film in the ink jet printing. Thus, the coating film was unsuitable for use as the ink jet-receiving layer.

Figure 2:
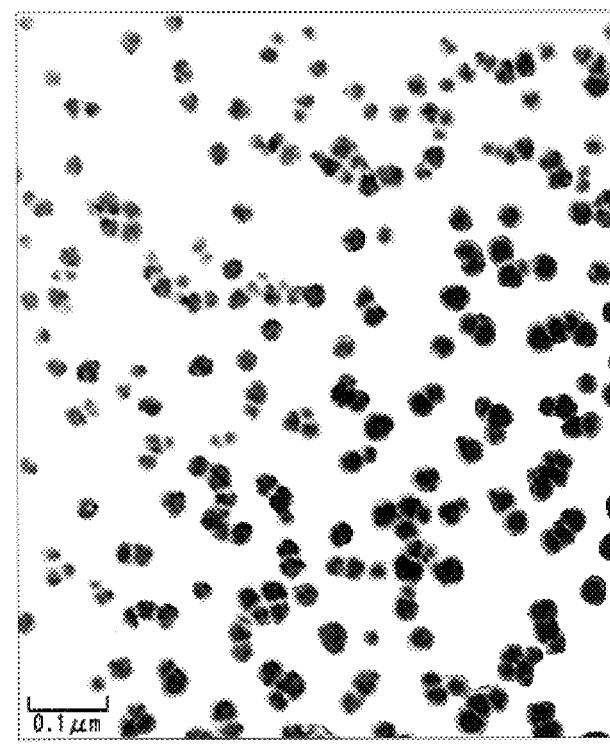
FIG. 2 is a transmission electron photomicrograph of silica particle agglomerates in a dispersion of them obtained in comparative Example 2.

A transmission electron photomicrograph of the silica particles is shown in FIG. 2. The silica particles contained in this dispersion scarcely formed the structure of the agglomeration of many primary particles as shown in FIG. 1.

COMPARATIVE EXAMPLE 3

0.015 mol of ammonia was added to 1000 g of the same aqueous active silicic acid solution as that used in Example 1. By the addition of ammonia, pH of this aqueous active silicic acid solution was elevated from 2.9 to 7.5. 500 g of distilled water was heated to 100° C. in the same reaction vessel as that used in Example 1. Then 1000 g of this aqueous active silicic acid solution was added to the hot water at a rate of 1.5 g/min. After the completion of the addition of active silicic acid, the thus-obtained solution was kept at 100° C. under reflux for 13 hours to obtain a dispersion of silica particles.

The thus-obtained dispersion of silica particles was a slightly bluish, transparent liquid having pH of 7.9. The properties of the thus-obtained dispersion of silica particles are shown in Table 2, and those of the coating film containing the silica particles are shown in Table 3. The silica particles contained in this dispersion had a pore volume of as small as 0.41 ml/g. Although the coating film containing the silica particles had a high transparency and a high gloss, the ink was scarcely absorbed in the coating film in the ink jet printing. Thus, the coating film was unsuitable for use as the ink jet-receiving layer.

TABLE 1

| | Properties of seed dispersion | | | |
|---|---|---|---|---|
| | Average diameter of secondary particles (nm) | Specific surface area (m²/g) | Pore volume (ml/g) | Pore diameter (nm) |
| Ex. 1 | 184 | 832 | 0.60 | 4 |
| Ex. 2 | 184 | 832 | 0.60 | 4 |
| Ex. 3 | 113 | 480 | 0.91 | 7 |
| Ex. 4 | 189 | 314 | 1.44 | 25 |
| Ex. 5 | 124 | 333 | 1.50 | 25 |
| Ex. 6 | 303 | 578 | 1.00 | 7 |
| Ex. 7 | 217 | 691 | 0.95 | 6 |
| Ex. 8 | 149 | 748 | 0.55 | 3 |
| Ex. 9 | 175 | 898 | 0.66 | 4 |
| Comp. Ex. 1 | — | — | — | — |
| Comp. Ex. 2 | — | — | — | — |
| Comp. Ex. 3 | — | — | — | — |

TABLE 2

| | Properties of dispersion of silica particle agglomerates | | | |
|---|---|---|---|---|
| | Average diameter of secondary particles (nm) | Specific surface area (m²/g) | Pore volume (ml/g) | Pore diameter (nm) |
| Ex. 1 | 130 | 257 | 1.01 | 16 |
| Ex. 2 | 137 | 228 | 1.07 | 18 |
| Ex. 3 | 106 | 268 | 0.76 | 12 |
| Ex. 4 | 186 | 164 | 1.41 | 30 |
| Ex. 5 | 251 | 186 | 1.43 | 39 |
| Ex. 6 | 195 | 237 | 1.29 | 21 |
| Ex. 7 | 173 | 340 | 1.35 | 16 |
| Ex. 8 | 64 | 220 | 0.75 | 14 |
| Ex. 9 | 155 | 280 | 1.18 | 16 |
| Comp. Ex. 1 | impossible to measure | 874 | 0.69 | 4 |
| Comp. Ex. 2 | 22 | 230 | 0.39 | 7 |
| Comp. Ex. 3 | 32 | 215 | 0.32 | 7 |

| | Properties of dispersion of silica particle agglomerates | | | | |
|---|---|---|---|---|---|
| | Particle size distribution (in terms of wt.) | | | Absorbance at 560 nm | |
| | Particle size at main peak (nm) | Cumulative wt. at main peak (%) | Standard deviation (nm) | Solid conc. 1 wt. % | Solid conc. 10 wt. % |
| Ex. 1 | 31 | 90 | 3 | 0.10 | 0.16 |
| Ex. 2 | 21 | 90 | 2 | 0.10 | 0.16 |
| Ex. 3 | 17 | 97 | 2 | 0.07 | 0.13 |
| Ex. 4 | 21 | 82 | 1 | 0.32 | 0.61 |
| Ex. 5 | 373 | 66 | 143 | 0.45 | 1.07 |
| Ex. 6 | 44 | 92 | 4 | 0.19 | 0.27 |
| Ex. 7 | 40 | 95 | 4 | 0.12 | 0.45 |
| Ex. 8 | 17 | 97 | 2 | 0.02 | 0.07 |
| Ex. 9 | 21 | 82 | 1 | 0.09 | 0.07 |
| Comp. Ex. 1 | impossible | impossible | impossible | impossible | impossible |
| Comp. Ex. 2 | 10 | 99 | 2 | 0.02 | 0.07 |

TABLE 2-continued

| | | | | | |
|---|---|---|---|---|---|
| Comp. Ex. 3 | 13 | 99 | 2 | 0.01 | 0.04 |

TABLE 3

Quality of coating film containing silica particle agglomerates

| | Amount of coating: 5 g/m² | | | Amount of coating: 25 g/m² | |
|---|---|---|---|---|---|
| | Transmittance (%) | Haze (%) | 75° gloss | Cracking | Ink absorption |
| Ex. 1 | 93 | 9 | 111 | 5 | 5 |
| Ex. 2 | 88 | 20 | 69 | 5 | 5 |
| Ex. 3 | 91 | 10 | 114 | 5 | 4 |
| Ex. 4 | 90 | 19 | 55 | 5 | 5 |
| Ex. 5 | 88 | 27 | 37 | 5 | 5 |
| Ex. 6 | 91 | 15 | 73 | 5 | 5 |
| Ex. 7 | 93 | 8 | 98 | 3 | 5 |
| Ex. 8 | 91 | 5 | 135 | 5 | 3 |
| Ex. 9 | 94 | 7 | 119 | 5 | 5 |
| Comp. Ex. 1 | impossible | impossible | impossible | impossible | impossible |
| Comp. Ex. 2 | 95 | 7 | 127 | 5 | 1 |
| Comp. Ex. 3 | 91 | 4 | 147 | 4 | 1 |

It is apparent from Table 2 that every silica particle agglomerate obtained in the Examples has a large pore volume and is stably dispersed in water to form a colloid. In particular, a silica particle agglomerate dispersion having a high transparency and a sharp particle size distribution can be obtained by the method wherein a seed dispersion is prepared from active silicic acid and an alkoxysilane and then the fine silica dispersion is prepared therefrom.

Further, the coating film prepared from such a silica particle agglomerate dispersion serves as the ink jet receiving layer of a high ink absorption. All the silica particle agglomerates obtained in the Examples have a large pore volume and are capable of forming porous layer by drying. Although this porous layer has a disadvantage in the mechanical strength, they are not easily cracked by the capillary force upon drying like the silica particles having a small pore volume obtained in Comparative Example 2. This property is very advantageous in the production of ink jet recording media.

In the silica particle agglomerate dispersion prepared by the present invention, fine, porous secondary particles, formed by the agglomeration of the primary particles, are dispersed in the form of a colloid. The dispersion is transparent and the particle size distribution is sharp. A porous, transparent coating layer can be formed by applying the dispersion of silica particle agglomerates to a support and drying it. For example, when the coating layer is used for forming an ink-receiving layer of an ink jet recording paper, the thus-obtained layer has a high gloss, high transparency and a high color density by ink jet recording.

What is claimed is:

1. A process for producing a colloidal dispersion of silica particle agglomerates having a specific surface area, as determined by nitrogen adsorption method, of 100 $m^2/g$ to 400 $m^2/g$, an average secondary particle diameter of 20 nm to 300 nm and a pore volume of 0.5 mug to 2.0 mug, which comprises the steps of (i) adding an aqueous active silicic acid solution to water having a temperature of not lower than 50° C. in the solid content (calculated in terms of $SiC_2$) of the aqueous active silicic acid solution of 0.01 to 1.5 parts by weight for 500 parts by weight of the water per minute or (ii) heating an aqueous active silicic acid solution to prepare a colloidal dispersion of silica particle agglomerates having a specific surface area, as determined by nitrogen adsorption method, of 300 $m^2/g$ to 1,000 $m^2/g$ and a pore volume of 0.4 ml/g to 2.0 mug as a seed dispersion, adding an alkali to the seed dispersion and then adding a feed solution comprising at least one of an aqueous active silicic acid solution and alkoxysilanes to the seed dispersion in an amount of 0.001 to 0.1 mol/min, in terms of $SiC_2$ per mol, of $SiC_2$ contained in the seed particle agglomerates in the seed dispersion and growing the primary fine particles of the silica particle agglomerates.

2. A process for producing a colloidal dispersion of silica particle agglomerates having a specific surface area, as determined by nitrogen adsorption method, of 100 $m^2/g$ to 400 $m^2/g$, an average secondary particle diameter of 20 nm to 300 nm and a pore volume of 0.5 ml/g to 2.0 ml/g, which comprises the steps of (i) adding an aqueous active silicic acid solution to water having a temperature of not lower than 50° C. in the solid content (calculated in terms of $SiC_2$) of the aqueous active silicic acid solution of 0.01 to 1.5 parts by weight for 500 parts by weight of the water per minute or (ii) heating an aqueous active silicic acid solution to prepare a colloidal dispersion of silica particle agglomerates having a specific surface area, as determined by nitrogen adsorption method, of 300 $m^2/g$ to 1,000 $m^2/g$, and a pore volume of 0.4 ml/g to 2.0 ml/g as a seed dispersion, and adding a mixture of a feed solution comprising at least one of an aqueous active silicic acid solution and alkoxysilanes and an alkali to the seed dispersion in an amount of 0.001 to 0.1 mol/min, in terms of $SiC_2$ per mol of $SiO_2$ contained in the seed particle agglomerates in the seed dispersion or adding the feed solution and the alkali at the same time and growing the primary fine particles of the silica particle agglomerates.

3. The process for producing a colloidal dispersion of silica particle agglomerates according to claim 1 or 2, wherein the seed dispersion is one that is prepared by adding the aqueous active silicic acid solution in small portions to hot water.

4. The process for producing a colloidal dispersion of silica particle agglomerates according to claim 1 or 2, wherein the seed dispersion is one that is prepared by heating the aqueous active silicic acid solution.

5. The process for producing a colloidal dispersion of silica particle agglomerates according to claim 1 or 2, wherein the alkali is ammonia.

6. A process for producing a colloidal dispersion of silica particle agglomerates having a specific surface area, as determined by nitrogen adsorption method, of 150 $m^2/g$ to 400 $m^2/g$, an average secondary particle diameter of 20 nm to 300 nm and a pore volume of 0.5 ml/g to 2.0 ml/g, which comprises the steps of (i) adding an aqueous active silicic acid solution to water having a temperature of not lower than 50° C. in the solid content (calculated in terms of $SiO_2$) of the aqueous active silicic acid solution of 0.01 to 1.5 parts by weight for 500 parts by weight of the water per minute or (ii) heating an aqueous active silicic acid solution to prepare a colloidal dispersion of silica particle agglomerates having a specific surface area, as determined by nitrogen adsorption method, of 300 $m^2/g$ to 1,000 $m^2/g$ and a pore volume of 0.5 mug to 2.0 mug as a seed dispersion, adding an alkali to the seed dispersion and then adding a feed solution comprising at least one of an aqueous active silicic acid solution and alkoxysilanes to the seed dispersion in an amount of 0.001 to 0.1 mol/min, in terms of $SiO_2$ per mol of $SiO_2$ contained in the seed particle agglomerates in the seed dispersion and growing the primary fine particles of the silica particle agglomerates.

7. A process for producing a colloidal dispersion of silica particle agglomerates having a specific surface area, as determined by nitrogen adsorption method, of 150 $m^2/g$ to 400 $m^2/g$, an average secondary particle diameter of 20 nm to 300 nm and a pore volume of 0.5 ml/g to 2.0 ml/g, which comprises the steps of (i) adding an aqueous active silicic acid solution to water having a temperature of not lower than 50° C. in the solid content (calculated in terms of $SiO_2$) of the aqueous active silicic acid solution of 0.01 to 1.5 parts by weight for 500 parts by weight of the water per minute or (ii) heating an aqueous active silicic acid solution to prepare a colloidal dispersion of silica particle agglomerates having a specific surface area, as determined by nitrogen adsorption method, of 300 $m^2/g$ to 1,000 $m^2/g$, and a pore volume of 0.5 ml/g to 2.0 ml/g as a seed dispersion, and adding a mixture of a feed solution comprising at least one of an aqueous active silicic acid solution and alkoxysilanes and an alkali to the seed dispersion in an amount of 0.001 to 0.1 mol/min, in terms of $SiO_2$ per mol of $SiO_2$ contained in the seed particle agglomerates in the seed dispersion or adding the feed solution and the alkali in an amount of 0.001 to 0.1 mol/min, in terms of $SiO_2$ per mol of $SiO_2$ contained in the seed particle agglomerates in the seed dispersion at the same time and growing the primary fine particles of the silica particle agglomerates.

* * * * *